(12) United States Patent
Wimberger-Friedl et al.

(10) Patent No.: US 6,707,885 B2
(45) Date of Patent: Mar. 16, 2004

(54) METHOD FOR PRODUCING A GRID STRUCTURE

(75) Inventors: Reinhold Wimberger-Friedl, Eindhoven (NL); Jakob Wijnand Mulder, Eindhoven (NL); Johan Gerrit De Bruin, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/024,784

(22) Filed: Dec. 20, 2001

(65) Prior Publication Data

US 2002/0176538 A1 Nov. 28, 2002

(30) Foreign Application Priority Data

Dec. 22, 2000 (EP) .............................. 00128316

(51) Int. Cl.⁷ .................................. G21K 1/00
(52) U.S. Cl. ..................................... 378/154
(58) Field of Search ................ 378/154, 145; 250/505.1; 430/4

(56) References Cited

U.S. PATENT DOCUMENTS 3,919,559 A * 11/1975 Stevens ....................... 378/154
5,581,592 A * 12/1996 Zarnoch et al. ............. 378/154
5,866,265 A * 2/1999 Reilly et al. ................. 428/492

OTHER PUBLICATIONS

International Search Report—PCT/IB 01/02417—Apr. 19, 2002.*

* cited by examiner

*Primary Examiner*—Edward J. Glick
*Assistant Examiner*—Courtney Thomas
(74) *Attorney, Agent, or Firm*—John Vodopia

(57) ABSTRACT

A method is provided for producing a grid structure using an extrusion process. In order to extrude a layered structure exhibiting a high aspect ratio, a multiplication die is used. Such a method is also suited to manufacture X-ray scatter grids, which include X-ray absorbing and X-ray transmitting regions. The X-ray scatter grid is designed to be used in an X-ray examination apparatus.

6 Claims, 4 Drawing Sheets

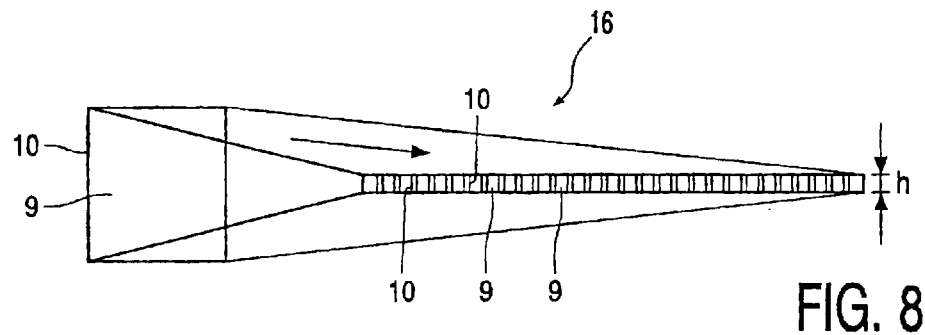
FIG. 8
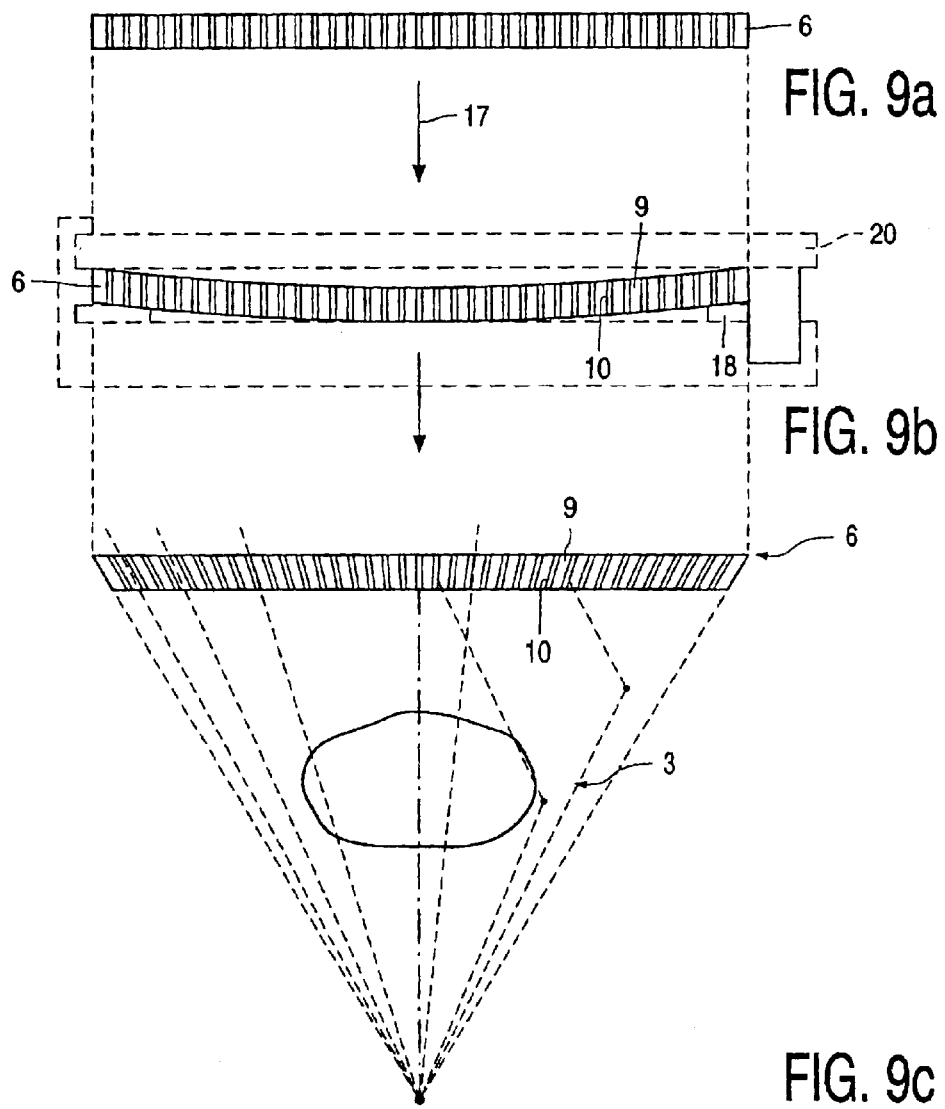
FIG. 9a
FIG. 9b
FIG. 9c

METHOD FOR PRODUCING A GRID STRUCTURE

FIELD OF THE INVENTION

The invention relates to a method of manufacturing a grid structure with regions exhibiting different properties.

The invention further relates to an X-ray examination apparatus for irradiating an object by means of X-rays, the examination apparatus including an X-ray source, and an X-ray detector, a receiving space for the object to be irradiated arranged between the X-ray source and the X-ray detector, and an X-ray scatter grid with successive regions of different X-ray absorptivity, said X-ray scatter grid to be arranged between the object and the X-ray detector.

BACKGROUND OF THE INVENTION

Grid structures are commonly used as monitor collimators or as privacy screens. In such cases it is desirable that the grid has a regular structure with, for example regions having different optical properties so that viewing from only one preferred direction can be achieved. On the other hand, it is desirable that the regular structure has a high aspect ratio (with high height-to-width ratio) of the individual regions in the structure.

For the X-ray imaging of objects it is desirable that scattered radiation originating within a patient is attenuated as much as possible by a similar grid structure, commonly referred to as an X-ray scatter grid. The X-ray scatter grid is usually arranged prior to the X-ray detector with respect to X-ray propagation. When such an X-ray scatter grid is intercepting the beam path behind an object to be examined, for example a patient, the absorption in the patient can be accurately detected in a spatially resolved manner, without scattered radiation from the object being examined leading to uncontrolled intensification of individual areas in the signal measured behind the object.

A method to produce an X-ray scatter grid is known from DE-PS 953 303. The known document discloses a manufacturing method of a supporting member for a scatter grid from a molten mass by way of an extrusion process; said supporting member is provided with regular cut-outs by means of an appropriate comb-like plate. The cut-outs do not extend completely through the supporting member and are subsequently filled with admixtures, notably with metals having a high absorption coefficient for X-rays, thus providing a scatter grid with material strips exhibiting a different X-ray absorption. This process is limited practically by the aspect ratio which can be achieved. Very thin comb-like structures have to be extruded with a very high accuracy. State-of-the-art extrusion is not capable of making structures which are required for present grid designs. The second step, i.e. filling the open channels with an absorbing material requires a low-viscosity material. This limits the percentage of absorbing filler material so that less than one lead equivalent can be achieved. The use of metal strips to insert in the extruded channels is practically not attractive as these have to be fixed in a separate step with very high accuracy. The quality of the X-ray grids is decreased by even small variations in the pitch of the stack due to trimming faults of the material stripes, variations in the viscosity of the glue, dust inclusions and delaminations. Furtheron, with the known method it is not possible to produce a scatter grid with an accurately defined regions of substantial height having a thin cross-section.

It is an object of the invention to produce a scatter grid, where the above mentioned shortcomings are mitigated.

SUMMARY OF THE INVENTION

The method according to the invention is characterized in that the material strips exhibiting different properties are extruded so as to form the regions of said grid structure. By applying a per se known extrusion process to manufacture the grid structure, a one-step process is achieved, where all material layers are combined, leading to no limitations in the height of the layered structure. Secondly, because the successive regions of different properties are formed by extruded material strips in accordance with the invention, they can be manufactured in a similar manner. Each time layers that are closed in themselves are formed and arranged one on top of the other, thus forming a clean, well-defined interface with one another. The method can be performed continuously so that the execution is faster and with reduced manufacturing costs. Thus it is a process which can be scaled up easily and the manufacturing costs do not increase with decreasing pitch and hardly with increasing size. Material interfaces are generated in situ and are not exposed to air, reducing probability of contamination.

The manufacture is significantly simplified notably when two material strips of different properties are co-extruded; moreover, the layers thus formed are cooled simultaneously. The bonding of the layers to one another is thus optimized while at the same time a well-defined interface is formed.

An embodiment of the method according to the invention is characterized in that the grid structure is an X-ray scatter grid with successive regions having different X-ray absorption coefficients, characterized in that material strips exhibiting a different X-ray absorption behavior are used. Such an assembly, notably comprising a plurality of strips in an alternating arrangement, can be deformed as a unit so as to realize a thickness in the millimeter range in the direction of the beam path. It is also advantageously possible to realize focusing by realizing an inclination of individual strips, for example by means of an extrusion die, and by subsequently performing a deformation during which the inclination of the strips is obtained.

The multiplication of the alternating succession of strips is effectively realized by means of a device for the multiplication of material strips which divides the material strips in the direction perpendicular to the longitudinal direction of the co-extruded material strips and compresses said material strips so as to form a packet of reduced height, after which stacking takes place. In a typical implementation the number of strips is thus doubled in each multiplication step, but also multitudes of this operation can be realized in a single element by dividing the melt stream in a multitudes of channels.

Further advantages and details of the invention will become apparent from the description of the following embodiment of the invention which is illustrated in the drawings.

BRIEF DESCRIPTION OF THE DRAWINGS

FIG. 8 shows a device, a so-called extrusion die, for pressing the height of the layered member produced so as to form the X-ray scatter grid, FIG. 9 is a flow chart illustrating the conversion of the layered member formed into a focused structure.

DETAILED DESCRIPTION OF THE PREFERRED EMBODIMENTS

Figure 1:
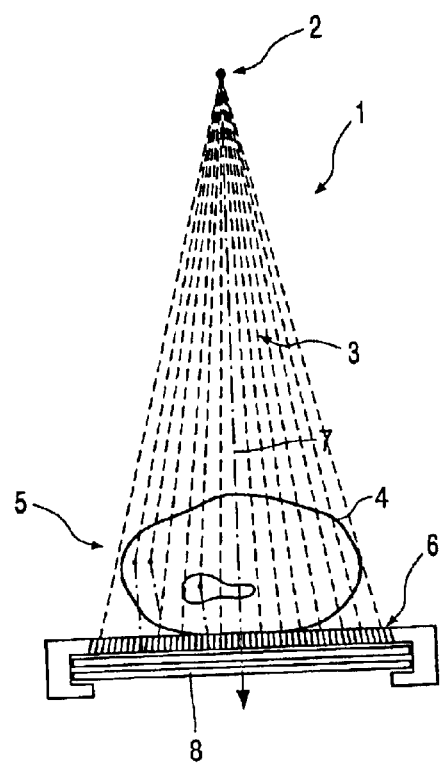
FIG. 1 shows diagrammatically the overall construction of an examination apparatus which includes an X-ray source, a receiving space for an object to be irradiated, and an X-ray scatter grid.

The X-ray examination apparatus 1 shown in FIG. 1 includes an X-ray source 2 which emits X-rays 3 which diverge in the direction of an object 4 to be irradiated which is, for example a patient or a material to be examined, for example a workpiece. The object 4 is arranged in a receiving space 5. An X-ray scatter grid 6 is arranged behind the object 4 to intercept the X-ray beam 3. In the direction of the beam axis 7 the X-ray scatter grid 6 is succeeded by a detector 8, for example a film, which serves to form a two-dimensional image of the object 4 to be examined.

Figure 2:
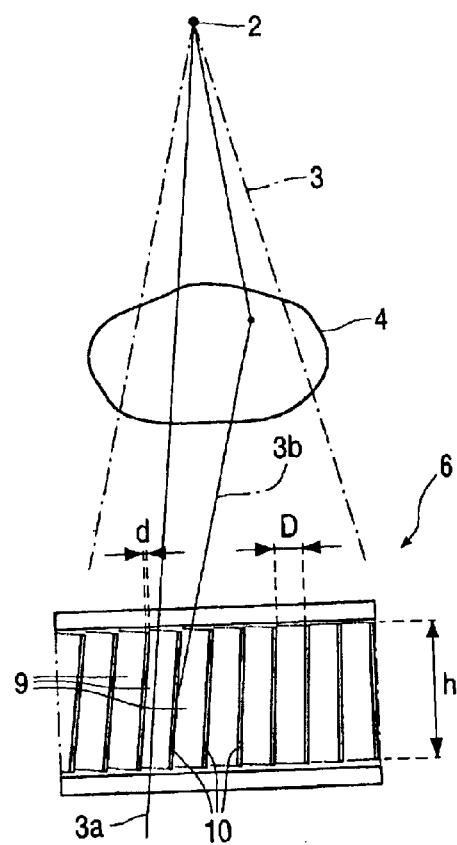
FIG. 2 shows the detail of the X-ray scatter grid of FIG. 1.

As is shown in FIG. 2, the X-ray scatter grid 6 comprises alternating regions of materials 9,10 having different X-ray absorption. Usually, the regions 9 are manufactured from a material having a very low X-ray absorption so that all X-rays spatially aligned with regions 9 are transmitted by the X-ray scatter grid 9. Such X-rays correspond to rays 3a, which did not undergo an X-ray scattering in the path between the X-ray source 2 and an element 9. On the other hand, the X-rays of the type 3b, which did undergo an X-ray scattering are no longer aligned with the cells 9 and are intercepted by the elements 10 and absorbed within the elements 10. The material for the elements 10 is chosen so that it has a high X-ray absorption. Thus, the X-ray absorption grid functions as a filter to intercept the scattered X-rays, which do not contribute to the attenuation information of the object. The strips 9 are made, for example of a polymeric material. Feasible materials in this respect are all thermoplastic polymers, like polymethyl methacrylate (PMMA) or polycarbonate which may be supplemented which may be supplemented with flow modifiers, for example plasticising agent DOP (dioctyl phthalate) A typical enrichment with plasticiser amounts to approximately 20%. It is also possible to use ABS (poly-(acrylo-nitrile-butadiene-styrene) with an addition of Kraton Liquid (hydroxy oligoethylene-butylene). Filling material, for example, aluminum oxide or carbon black (or other compounds with light nuclei) can be added to the material of the strip 9 so as to enhance the flow behavior in the multiplication cell at the cost of a slightly increased X-ray absorption.

In general metals are suitable filling materials for manufacturing of strips 10, preferably metals with heavier nuclei, like W. It is also possible to utilize salts for manufacturing of the X-ray absorbing strips 10. Metal powders of nickel and/or tungsten, can also be used as the absorbing materials and hence as admixtures for the material strips 10. In that case the size of the powder particles is less than 10 μm. The absorptivity of tungsten is approximately twice that of lead. Therefore, the thickness d of the material strip 10 may be kept small so as to avoid an excessive overall loss of intensity of the X-rays 3, thus also avoiding the occurrence of wide bands without information on the film 8. Another advantage of small strips 10 is that the dose delivered to the patient stays low.

Figure 3:
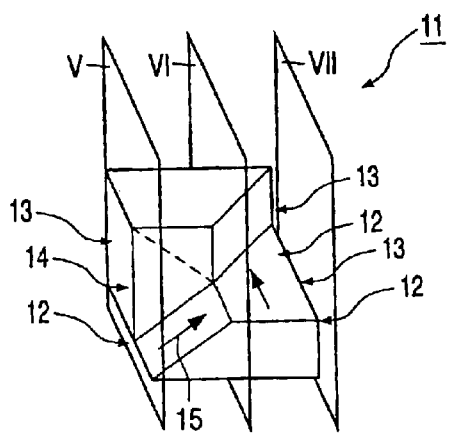
FIG. 3 shows a single multiplication element of the extrusion die.

In an embodiment of FIG. 3, the material flows 13, 12 are co-extruded, the actual extrusion being succeeded by a device 11 for multiplying material strips 13, 12 that are situated one over the other. The flows 13,12 after subsequent multiplication will result in the material strips 9,10 of the layered structure. The stability of the interface between the various material strips 9, 10 is dependent on the flow behavior of the materials used. Therefore, special attention should be paid to such behavior. The choice of the share of the filling or binding agent, therefore, is dependent on the flow requirements. This choice can be made based on the ratio of the wall slip and the internal shear deformation of the two materials used for the co-extrusion. This ratio can be expressed by a so-called β-value:

$$\beta = V_S/\tau_w * \eta/R, \text{ where}$$

$V_s$ is a value of the slip velocity at the wall $\tau_w$ is a value of the shear stress at the wall $\eta$ is a value of the true viscosity of the material R is the dimension of the channel in the multiplication element.

In FIG. 3, the stock used to realize an X-ray scatter grid is formed by two material strips 12 and 13 of comparable viscosity that are melted and co-extruded in comparable circumstances. Such input stock strips 12, 13 can be fed to the multiplication device 11 in the form of the stacked layers or adjacently arranged layers. In FIG. 3 a cutting edge 14 of the multiplication device 11 separates the strips 12, 13 each time perpendicularly to their longitudinal direction; subsequently, a two-layer assembly of input stock strips 12 and 13 is transported upwards on a ramp 15 and is allowed to expand laterally so that the original width of the assembly 12, 13, that is, the width before cutting, is restored. The other part of the cut assembly 12, 13 travels downwards on a ramp 18 and, upon lateral expansion, takes in a position in the opposite direction underneath the previously described expanded two-layer assembly of input stock layers 12, 13. Subsequent to a first multiplication operation the two-layer assembly has thus become a four-layer assembly. By arranging a set of multiplication elements behind each other a higher degree layer multiplication can be achieved.

Figure 4:
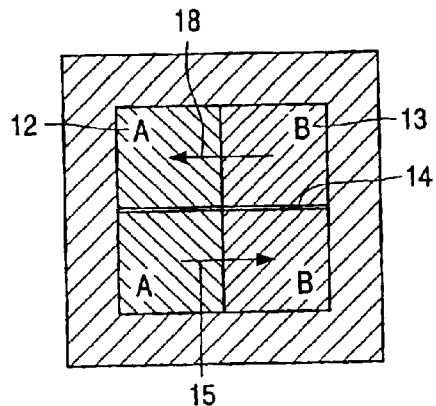
FIG. 4 is a view of the extruded column, that is, approximately at the area of the plane V in FIG. 3 and rotated through 90°.
Figure 5:
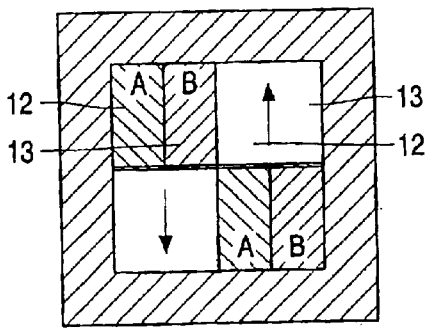
FIG. 5 is a view similar to FIG. 4, that is, approximately at the area of the plane VI in FIG. 3 and again rotated through 90°.
Figure 6:
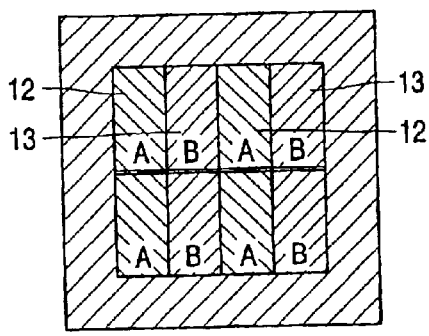
FIG. 6 is a view similar to FIG. 5, that is, approximately at the area of the plane VII in FIG. 3 and again rotated through 90°.

This is also shown in the FIGS. 4 to 6, that is, rotated through 90°. FIG. 4 illustrates the cutting by the edge 14 as well as the subsequent upwards travel of one part of the assembly 12, 13 on the ramp 15 and the parallel downwards travel of the separated part of the assembly 12, 13 on the ramp 18. FIG. 5 shows the position in which the lateral expansion of the input stock strips 12, 13 commences; at the exit of a multiplication element they have become stacked on one another as four layers of the same initial width (or height in the rotated representation) so that the two-layer assembly has been converted into a four-layer assembly.

Figure 7:
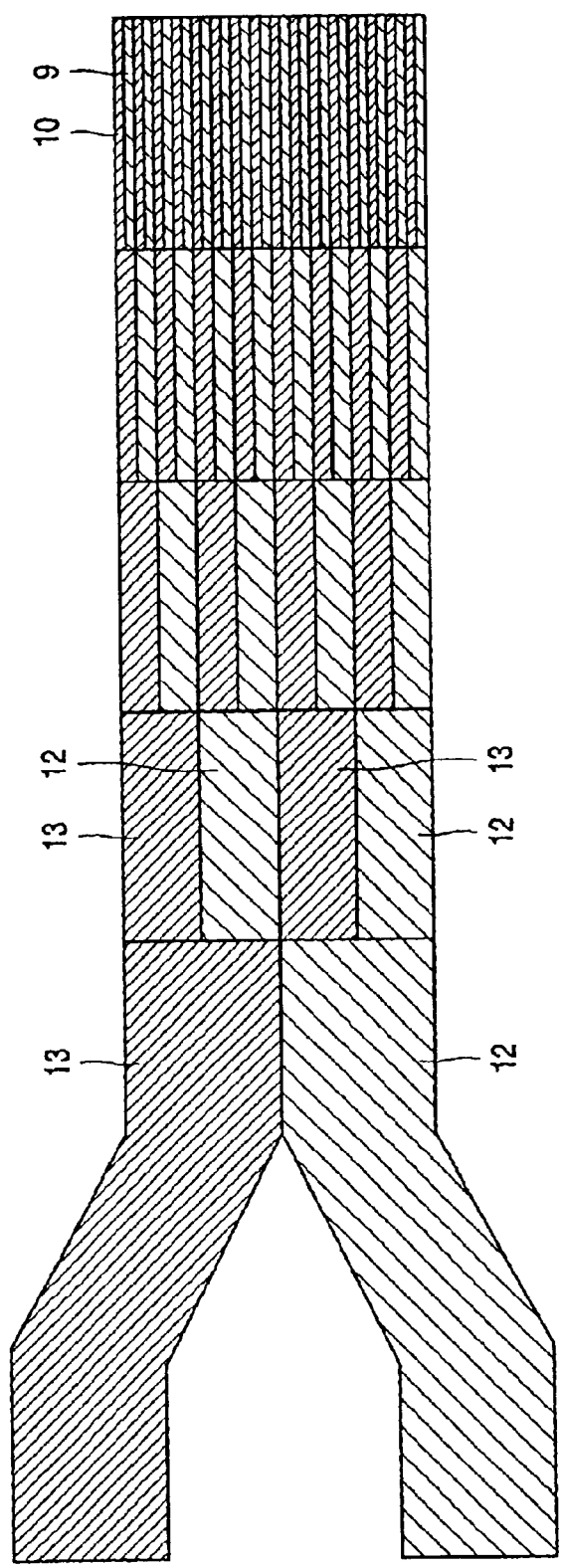
FIG. 7 shows the extruded column of material strips co-extruded in accordance with the invention during their passage through the device for multiplying material strips.

FIG. 7 illustrates how a set of devices 11 (not shown) convert the input stock strips 12, 13, by repeated multiplication in the described manner or a similar manner, overall into a multi-layer assembly with superposed layers 12, 13 which constitute the material strips 9, 10 in the X-ray scatter grid 6 after a subsequent cutting operation (not shown).

Referring to FIG. 8, the input stock strips 12, 13 (not shown) are maintained in a molten or in a melt-like condition during the multiplication. The material strips 9, 10 obtained at the end of the multiplication process pass through an extrusion device 16, from which the layered structure is finally extruded. The extrusion device 16 schematically shows two operations, where the flow is transformed in two dimensions simultaneously. It is also possible that these two operations are performed one after the other, so that the deformation of the material in the extrusion die in order to convert the multilayer into a plate with a correct width and height is split into two steps each of which being a uniaxial deformation. The device 16, shown in the FIG. 8 performs a pressing operation in the direction transversely of the longitudinal direction of the material strips 9, 10, thus forming a wide flat member which height h is in the range of up to a few millimeters. An example for the thickness dimension h parallel to the beam axis 7 is in the range of from 0.5 mm to 2 mm.

FIG. 9 schematically illustrates the steps 17,18 of a further processing of the layer structure in case the structure must show a certain degree of convergence towards its central ray. The flat member initially formed (FIG. 9*a*) contains the material strips 9, 10 with different absorption coefficients in the direction transversely of its width. The pressing device 20 schematically shown in FIG. 9*b* is constructed in such a manner that at the same time it imparts to the flat member body being formed in a shape that deviates from a plane by viscous deformation. This step can be integrated in the continuous extrusion step by adding a transition to a curved shape in the extrusion die. After that the curved structure is flattened again, for example by means of pressing in the elastic state (as a separate operation). After deformation into the flat shape, the assembly is cooled so that the flat shape is frozen in.

The material strips 9, 10 thus assume the inclined position shown, as is shown in the FIG. 9*c*. The subsequent cooling and elastic deformation of the overall surface convert the assembly of the strips 9, 10 into a plane assembly again, the transmission direction of the strips 9 and the direction of the strips 10 being directed essentially towards a point 2 that corresponds to the X-ray source in the operational condition. Scattered radiation that does not follow the direction of propagation of the rays 3 (FIG. 1), therefore, cannot traverse the element 6 acting as a grid, because they cannot pass through the grid 6 in the direction parallel to the longitudinal direction of the strips 9 but are incident at an angle on the absorbing strips 10. As a result, the scattered radiation is absorbed as fully as possible. Only rays that travel through the grid 6 in the direction parallel to the longitudinal direction of the non-absorbing material strips 9 are transmitted without being absorbed and hence become available to the detector (not shown) for imaging. It must be noted that it is also possible to proceed in a different way. In this case, a thicker initial flat member 6 is extruded during the step illustrated in the FIG. 9*a*. Then instead of step 9*b* a machining of the upper surface of the member is applied so that to form a spherically shaped concave surface. During the step 9*c* the concave surface is flattened to form a flat scatter grid with inclined neighboring cells. Application of the machining step has an advantage that by the removal of a surface layer to shape a concave surface, the surface layer exhibiting minor irregularities in the thickness of the stripes 9,10 is removed resulting in a better quality of the scatter grid.

The combining of strips 9, 10 at a later stage can thus be dispensed. An assembly that acts as an X-ray scatter grid 6 can be formed by means of a manufacturing process involving co-extrusion and strip multiplication. The alignment of the strips in a direction corresponding to the divergence of the rays, which alignment can be realized by means of an extrusion die, ensures at the same time that the grid 6 is effective over a large width of the diverging radiation beam 3.

It must be noted, that alternatively to what is shown in the FIGS. 7 to 9, the thickness d of the absorbing material strips 10 and the thickness D of non-absorbing material strips 9 may be different (FIG. 2). The thickness d of an absorbing material strip 10 is typically in the range of from 15 $\mu$m to 50 $\mu$m, whereas the thickness of a non-absorbing material strip 9 typically lies in the range of from 150 $\mu$m to 350 $\mu$m.

What is claimed is:

1. A method of manufacturing an X-ray scatter grid structure with regions exhibiting different X-ray related properties, wherein the method comprises the steps of:
    extruding material strips exhibiting different X-ray transmissivities so as to form the regions of said X-ray scatter grid structure, wherein said regions alternate between materials having high X-ray transmissivity and materials having low X-ray transmissivity; and
    allowing at least one of the extruded material strips to expand in at least one direction such that at least one dimension of the at least one of the extruded material strips prior to extrusion is restored.

2. A method as claimed in claim 1, characterized in that the material strips are co-extruded.

3. A method as claimed in claim 1 or 2, wherein the X-ray scatter grid structure including successive regions having different X-ray absorption coefficients, characterized in that material strips exhibiting a different X-ray absorption behavior are used.

4. A method as claimed in claim 3, characterized in that two different material strips are fed to the entrance of a device for multiplying material strips, said material strips being divided a number of times during their travel through the device and being arranged in layers, thus forming an assembly of alternating material strips.

5. A method as claimed in claim 4, characterized in that the assembly formed is subjected to a deformation in a direction transverse to a propagation direction of the material strips in said device and that the assembly is subsequently subjected to a re-conversion into a flat assembly thus comprising alternating regions of the material strips, where the neighboring alternating regions remain in an inclined position relative to one another and focused to a centerline of the assembly.

6. A method as claimed in claim 1, characterized in that the extruded material strips travel in opposite directions.

* * * * *